(12) United States Patent
Kozlowski et al.

(10) Patent No.: US 10,711,811 B2
(45) Date of Patent: Jul. 14, 2020

(54) PNEUMATIC SERVOVALVE ASSEMBLY

(71) Applicant: Hamilton Sundstrand Corporation, Charlotte, NC (US)

(72) Inventors: Piotr Kozlowski, Mielec (PL); Piotr Sawicki, Bogdaniec (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 39 days.

(21) Appl. No.: 16/100,240

(22) Filed: Aug. 10, 2018

(65) Prior Publication Data
US 2019/0048900 A1 Feb. 14, 2019

(30) Foreign Application Priority Data

Aug. 12, 2017 (EP) ..................... 17461585

(51) Int. Cl.
*F16K 31/36* (2006.01)
*F15B 13/043* (2006.01)

(52) U.S. Cl.
CPC ...... *F15B 13/0433* (2013.01); *F15B 13/0438* (2013.01); *F16K 31/36* (2013.01)

(58) Field of Classification Search
CPC ............... F15B 13/043; F15B 13/0433; F15B 13/0438; F16K 31/36
See application file for complete search history.

(56) References Cited

U.S. PATENT DOCUMENTS

| 2,824,574 A * | 2/1958 | Place | F15B 13/0438 137/625.62 |
| 2,904,055 A * | 9/1959 | Witherell | F15B 13/0438 137/625.62 |
| 2,915,077 A * | 12/1959 | Wehrli | F15B 5/003 137/82 |
| 3,029,830 A * | 4/1962 | Klover | F15B 13/0438 137/82 |
| 3,211,063 A * | 10/1965 | Woodrow | F15B 13/0438 91/388 |

(Continued)

FOREIGN PATENT DOCUMENTS

| DE | 3049190 A1 | 4/1982 |
| GB | 2516693 A | 2/2015 |
| WO | 0159306 A1 | 8/2001 |

OTHER PUBLICATIONS

Extended European Search Report for International Application No. 17461585.6 dated Feb. 23, 2018, 8 pages.

*Primary Examiner* — Umashankar Venkatesan
(74) *Attorney, Agent, or Firm* — Cantor Colburn LLP

(57) ABSTRACT

The present disclosure relates to a servovalve assembly comprising a pair of opposed nozzles spaced apart by a first gap. A control element positioned in the first gap (G) between the pair of opposed nozzles. Each nozzle has an outlet opening. The control element has a central control portion and two resiliently deformable end portions at opposite ends of the central control portion. The central control portion is perpendicular to a central axis (C) of each nozzle outlet opening. The control element is configured such that the two resiliently deformable end portions elastically deform when the control element is placed under tension by a force applied parallel to the central control portion, so as to move the control element in a direction parallel to the central axis (C) of each nozzle outlet opening.

16 Claims, 4 Drawing Sheets

(56) References Cited

U.S. PATENT DOCUMENTS

| | | | | |
|---|---|---|---|---|
| 3,221,760 A | * | 12/1965 | Buchanan | F15B 13/0438 137/82 |
| 3,318,320 A | * | 5/1967 | Lloyd | F15B 13/0438 137/82 |
| 3,712,339 A | * | 1/1973 | Bartholomaus | F15B 13/0438 137/625.62 |
| 3,746,044 A | * | 7/1973 | Velicer | F15B 21/12 137/624.14 |
| 3,817,150 A | * | 6/1974 | Cox | F15B 9/12 91/186 |
| 4,922,963 A | * | 5/1990 | Robinson | F15B 13/0438 137/625.38 |
| 5,024,247 A | * | 6/1991 | Lembke | H01F 7/1615 137/82 |
| 5,070,898 A | * | 12/1991 | Jagodzinski | F15B 13/043 137/82 |
| 7,051,850 B2 | | 5/2006 | Kienholz | |
| 8,146,547 B2 | | 4/2012 | Lou | |
| 9,074,702 B2 | | 7/2015 | Morise | |
| 9,574,676 B2 | | 2/2017 | Laboda et al. | |
| 2015/0176720 A1 | * | 6/2015 | del la Chevasnerie | F16K 31/124 251/30.01 |
| 2015/0292525 A1 | * | 10/2015 | Baker | F15B 13/0438 137/14 |
| 2016/0102778 A1 | * | 4/2016 | Hoemke | F16K 11/07 137/12 |
| 2016/0160886 A1 | * | 6/2016 | Baker | F15B 13/0438 251/30.01 |
| 2019/0085870 A1 | * | 3/2019 | Wang | F15B 13/16 |

* cited by examiner

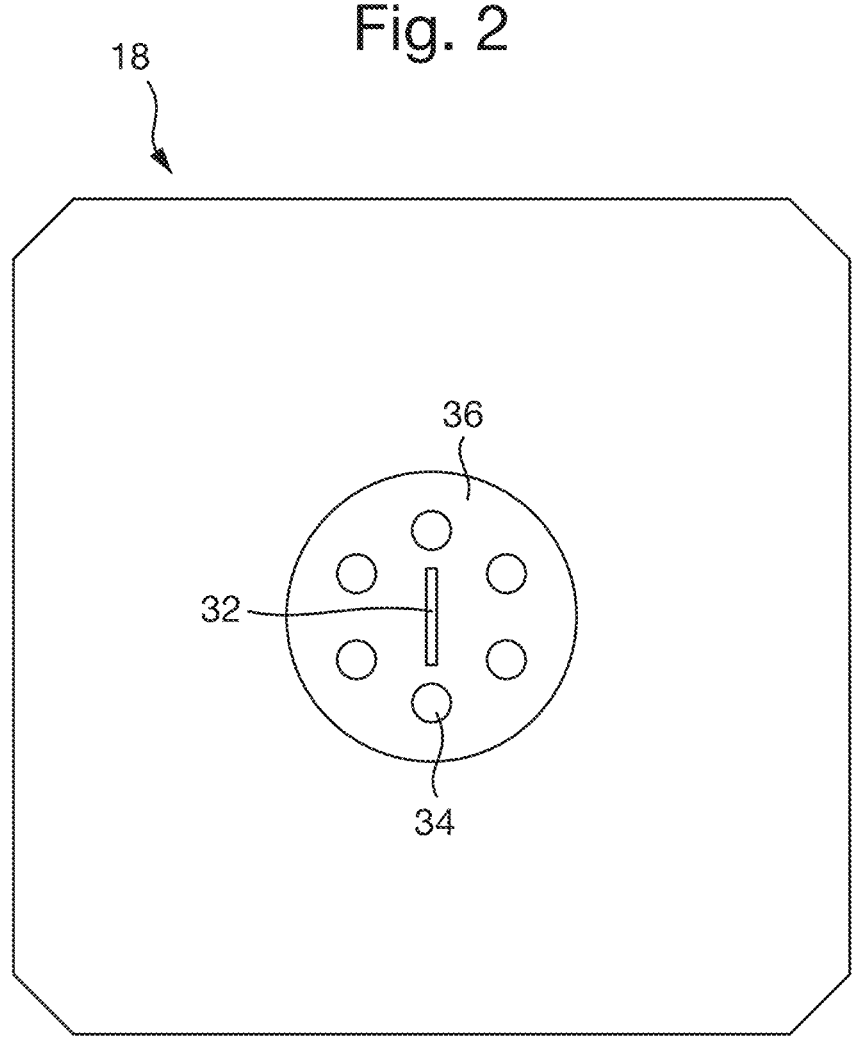

PNEUMATIC SERVOVALVE ASSEMBLY

FOREIGN PRIORITY

This application claims priority to European Patent Application No. 17461585.6 filed Aug. 12, 2017, the entire contents of which is incorporated herein by reference.

TECHNICAL FIELD

The present disclosure relates to a servovalve assembly for a servovalve, and in particular, for a three way single stage electro-pneumatic servovalve, utilized, for example to control air valves that manage air distribution through a variety of aircraft air management systems.

The present disclosure also relates to a servovalve including the servovalve assembly and a method of assembling the servovalve.

BACKGROUND

Single stage pneumatic servovalves are known for use in aircraft air management systems such as: engine bleed, cabin air conditioning, pressurization or wing and cowl anti ice protection. Flapper-nozzle type servovalves are often used in such applications, and utilize an armature attached to a torque motor to adjust airflow through nozzle outlets. In such servovalves, an O-ring seal is commonly used to seal off the pneumatic nozzle subsystem from the torque motor cavity. However, servovalves are required to operate at various pressures and temperatures depending on location in the air management system, and difficulties can arise with an increase in ambient and supply air temperatures, especially at engine high pressure bleed locations.

The present disclosure relates to an alternative flapper nozzle servovalve capable of handling high ambient and supply air temperatures.

SUMMARY

From one aspect, the present disclosure relates to a servovalve assembly in accordance with claim 1.

In one embodiment of the above servovalve assembly, the central control portion has a higher stiffness than the resiliently deformable end portions. In an additional or alternative embodiment, the central control portion is thicker than the resiliently deformable end portions.

The higher stiffness/thickness of the central control portion compared to the resiliently deformable end portions permits the deformable end portions to elastically deform before the central control portion does, when the control element is placed under tension by a force applied parallel to the central control portion.

As will be appreciated by the skilled person, this desired effect can be achieved in many ways, including providing a central control portion with a different material composition to the resiliently deformable end portions or a different material treatment, or by using a suitable variation in geometry between the central control portion and resiliently deformable end portions.

In a further embodiment of any of the above servovalve assemblies, the central control portion is planar and the resiliently deformable end portions are curved. In one embodiment, the end portions are shaped such that the control element is generally C-shaped. However, any suitable shape of end portions could be used, for instance, a planar, concave, convex or serpentine shape.

In a further embodiment of any of the above servovalve assemblies, the control element further comprises two clamping regions, one at the end of each resilient deformable end portion. The two clamping regions are offset from the central control portion along the central axis of each nozzle outlet opening.

The "offset" between the clamping regions and the central control portion allows the control element to move in a direction parallel to the central axis of each nozzle outlet opening in response to the tensile force applied parallel to the central control portion.

In a further embodiment of the above servovalve assembly, the assembly further comprises a nozzle housing, a pull rod for connection to a solenoid assembly at least partially received at one end of the nozzle housing, and a mounting plate at least partially received at an opposing end of the nozzle housing. A first of the two clamping regions is secured to the pull rod and a second of the two clamping regions is secured to the mounting plate. The mounting plate may include fluid ports configured to allow fluid communication through the mounting plate. The first clamping region may be secured to the pull rod by a ball-joint.

In a further embodiment, the servovalve assembly further comprises a bellows seal having two opposed longitudinal ends. The bellows seal surrounds at least a portion of the pull rod. The bellows seal is secured to the nozzle housing at a first of the two opposed longitudinal ends and to the pull rod at a second of the two opposed longitudinal ends.

Securing the bellows at longitudinal ends means it is aligned along its longitudinal axis, which is the "flexible" direction of the bellows (i.e. the direction in which the bellows concertina). This alignment of the bellows means they provide minimal resistance to pull rod movement.

In some embodiments, the bellows seal comprises a high temperature metal alloy, such as a nickel-cobalt alloy. In this manner, the bellows seal provides a high temperature seal for the pneumatic subassembly.

From another aspect, the present disclosure relates to a servovalve in accordance with claim 10.

The servovalve assembly (i.e. pneumatic subassembly) and the solenoid assembly are two separate subassemblies of the servovalve.

In an embodiment of the above servovalve, the position of the soft magnetic core is adjustable, to vary the size of the second gap. In an additional embodiment, the soft magnetic core is threadably attached to a servovalve housing.

The size of the second gap limits the maximum movement of the central control portion, by limiting the movement of the plunger and pull-rod along a longitudinal axis of the servovalve.

In a further embodiment of any of the above servovalves, the servovalve further comprises a bobbin on which the solenoid is wound. At least a portion of the plunger is surrounded by the bobbin and at least one bearing is disposed between the bobbin and the plunger. The bearing is configured to facilitate movement of the plunger relative to the bobbin in response to energisation of the solenoid.

In a further embodiment of the above servovalve, the at least one bearing comprises Polytetrafluoroethylene (PTFE) or graphite.

PTFE/graphite give the bearing high temperature resistance, as well as low friction properties to facilitate movement of the plunger relative to the bobbin. In this manner, the bearing helps prevent resistance against pull rod movement along the longitudinal axis of the servovalve during operation of the servovalve.

From yet another aspect, the present disclosure relates to a method of assembling the servovalve of any of the above embodiments in accordance with claim 14.

In an embodiment of the above method, the method further comprises the steps of providing a servovalve housing, and securing the servovalve housing over the solenoid assembly.

BRIEF DESCRIPTION OF DRAWINGS

Some exemplary embodiments of the present disclosure will now be described by way of example only, and with reference to the following drawings in which:

FIG. 1b shows a magnified view of FIG. 1a.

FIG. 2 shows a detailed view of the mounting plate of the servovalve assembly shown in FIG. 1.

DETAILED DESCRIPTION

Figure 1A:
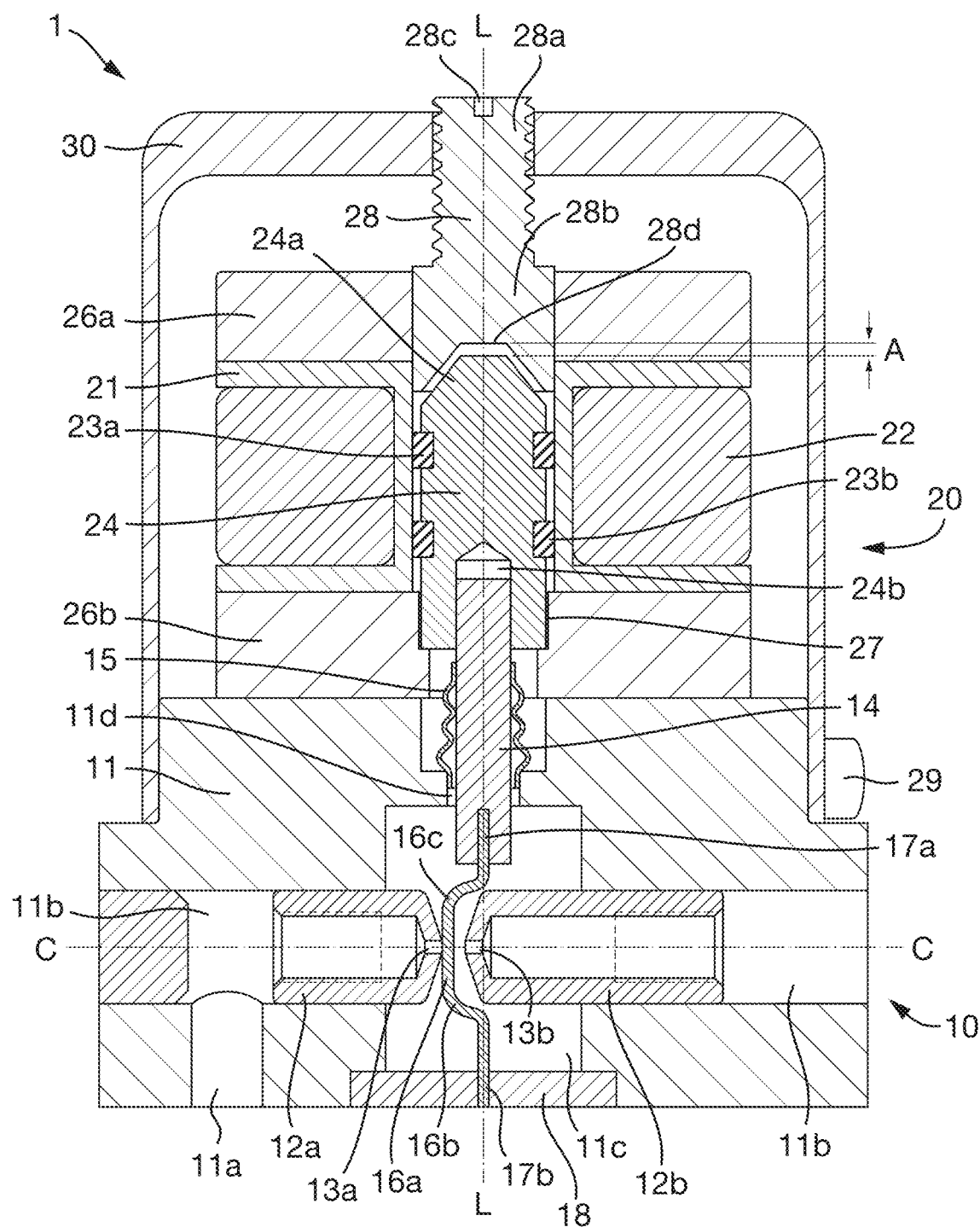
FIG. 1a shows an example of a servovalve in accordance with an embodiment of the present disclosure.

With reference to FIG. 1a, a servovalve 1 is illustrated. Servovalve 1 has a longitudinal axis L and comprises a servovalve assembly 10, a solenoid assembly 20 and a servovalve housing 30.

The servovalve assembly 10 comprises a nozzle housing 11 defining fluid supply port 11a, nozzle cavities 11b and control cavity 11c. Nozzles 12a, 12b are partially disposed in a respective one of the nozzle cavities 11b, and positioned such that an outlet opening 13a, 13b of each nozzle 12a, 12b is disposed in the control cavity 11c. In this manner, fluid exiting the outlet openings 13a, 13b will exit into the control cavity 11c. Nozzles 12a, 12b and outlet openings 13a, 13b (i.e. flow restriction) can be of any suitable shape and cross-section, for example, nozzles 12a, 12b can be cylindrical and outlet openings 13a, 13b can be circular. Each nozzle 12a, 12b has a central axis C. Although nozzles 12a, 12b and outlet openings 13a, 13b are shown as co-axial, it is to be understood that within the scope of this disclosure, they need not share the same central axis C, as long as their respective central axes are parallel to each other (i.e. the central axis of nozzle 12a and opening 13a may be offset from that of nozzle 12b and opening 13b along the longitudinal axis L of the servovalve 1). Outlet openings 13a, 13b are separated by a gap G along the central axis C. An exemplary gap G is 0.85 mm.

A mounting plate 18 is secured to the nozzle housing 11 and forms the base of the control cavity 11c. Opposite the mounting plate 18 (along longitudinal axis L) is a pull rod 14, which extends through an aperture 11d in the nozzle housing 11 and into the control cavity 11c.

As shown in FIG. 2, the mounting plate 18 features a central disc portion 36 comprising a slot 32 for receiving a clamping region 17b of a control element 16 (as discussed below), and a plurality of apertures 34. Apertures 34 extend through the thickness of mounting plate 18 and allow fluid communication through the mounting plate 18. In this manner, the apertures 34 provide a control port for the servovalve 1.

A bellows seal 15 is secured at one end to the nozzle housing 11 in aperture 11d and at an opposite end to the pull rod 14. The opposite ends of the bellows seal 15 may be welded to the nozzle housing 11 and pull rod 14, respectively, for instance by laser welding. Alternatively, bellows seal 15 ends may be brazed to the nozzle housing 11 and pull rod 14, respectively. Other forms of attachment may also be used.

Figure 3A:
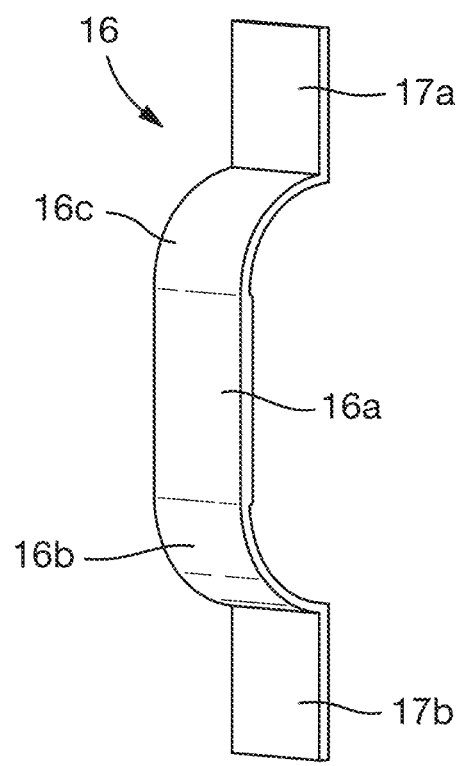
FIG. 3a shows a detailed view of the control element of the servovalve assembly shown in FIG. 1.

A control element 16 is secured between the pull rod 14 and the mounting plate 18, and passes through gap G between the nozzle outlet openings 13a, 13b. As shown in more detail in FIG. 3a, control element 16 comprises a central control portion 16a and two resiliently deformable end portions 16b, 16c extending from opposite ends of the central control portion 16a. Central control portion 16a is planar and the end portions 16b, 16c are curved, in this case quadrant shaped, such that the control element 16 is generally C-shaped. In some embodiments, the control element 16 comprises a stainless steel alloy, for instance, a 300 series stainless steel or 17-7 PH stainless steel. However, the control element 16 may be made of any material that has suitable corrosion, wear and fatigue resistance, as will be appreciated by one skilled in the art.

The control element 16 also comprises clamping regions 17a, 17b extending from the ends of each resiliently deformable end portion 16b, 16c. The clamping regions 17a, 17b are offset from the central control portion 16a along the central axis C. Clamping region 17a is secured to pull rod 14, for example, using a ball-joint (not shown) or by any other suitable means. Clamping region 17b is received in the slot 32 and secured to mounting plate 18 by a weld, an interference fit or by any other suitable means. In order to ensure accurate operation of the servovalve 1, it is important that the central control portion 16a is held perpendicular to the central axis C of the nozzle outlet openings 13a, 13b (i.e. parallel to the longitudinal axis L of the servovalve 1). A ball-joint connection between clamping region 17a and the pull rod 14 may assist in achieving this, as it will prevent any rotation of the pull rod 14 being transferred to the control element 16, which could twist the planar control portion 16a. It is to be noted that within the scope of this disclosure, any other suitable joint or connection between clamping region 17a and pull rod 14 that would prevent rotation of the pull rod 14 being transferred to the control element 16 could be used instead of a ball joint.

The control element 16 is configured to translate the position of the central control portion 16a relative to the central axis C of the nozzle outlet openings 13a, 13b due to the control element 16 being placed under tension by a force applied parallel to the central control portion 16a (i.e. parallel to the longitudinal axis L of the servovalve 1). The central control portion 16a has a higher stiffness than the resiliently deformable end portions 16b, 16c. In the depicted embodiment, higher stiffness is achieved by making the central control portion 16a thicker than the end portions 16b, 16c. In certain embodiments, the central control portion 16a is 20% thicker than the end portions 16b, 16c. For instance, in an exemplary embodiment the end portions 16b, 16c are 0.5 mm in thickness and the central control portion 16a is 0.6 mm in thickness.

It is to be noted, however, that any way of achieving differential stiffness may be used within the scope of this disclosure, for instance, by using different materials or different material treatments for the central control portion 16a and the end portions 16b, 16c. Other types of differential geometry may also be used to achieve the differential stiffness, as will be appreciated by the skilled person.

By "resiliently deformable" it is meant that when the tensioning force is removed, the end portions tend to return to their original shape.

Figure 3B:
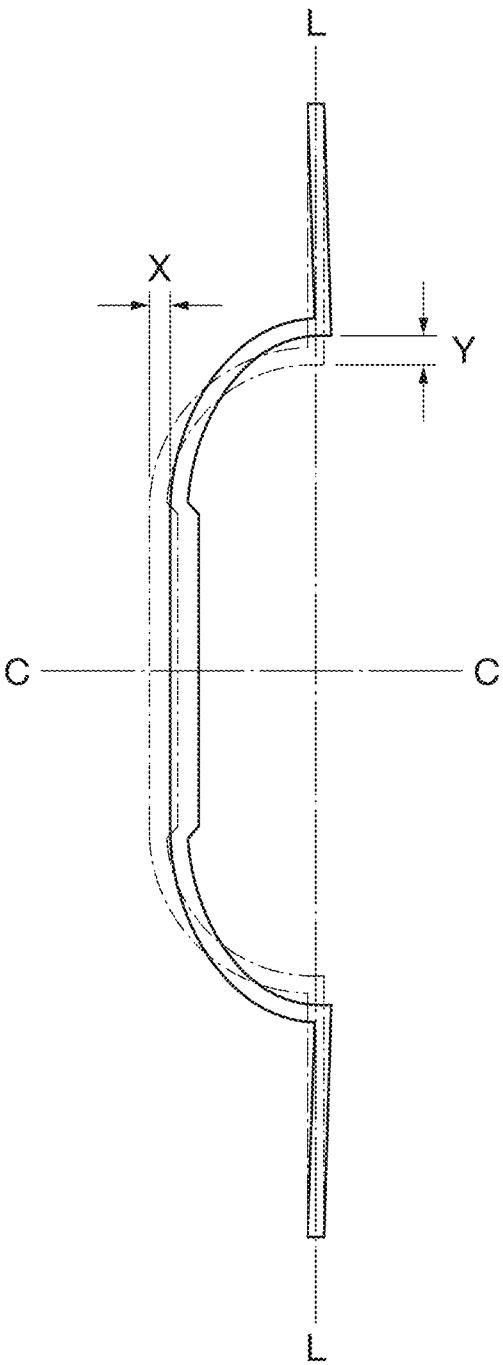
FIG. 3b shows a side-view comparison of the control element of FIG. 3a when it is in its rest state and when it is under tension.

As shown in FIG. 3b, in response to the tensioning force the resiliently deformable end portions 16b, 16c will deform elastically in advance of the central control portion 16a, as shown by arrow Y. Due to the shape of the control element 16 and the offset of the clamping regions 17a, 17b, the elastic deformation of the end portions 16b, 16c causes the central control portion 16a to translate as shown by arrow X. On removal of the tensioning force, the end portions 16b, 16c will return to their initial positioning due to their resilient nature.

It is important the end portions 16b, 16c are only deformed in the elastic deformation regime, and for this reason, the tensioning force should be limited to a maximum that does not exceed the yield stress of the end portions 16b, 16c.

Figure 1B:
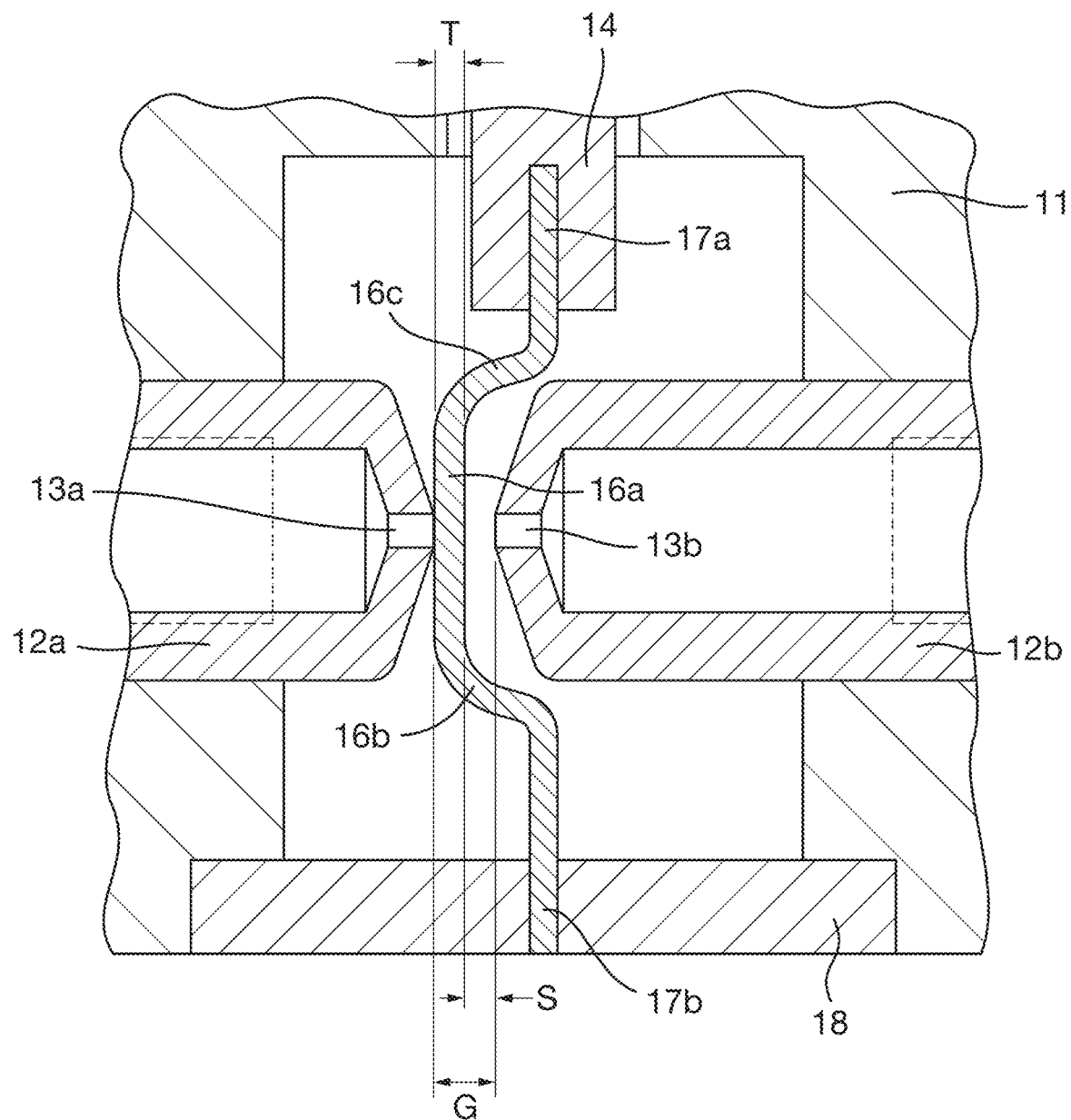

The amount of translation of central control portion 16a can be controlled by metering the amount of tensioning force applied and/or adjusting the resistance to deformation of the end portions 16b, 16c. In this manner, the position of the central control portion 16a between nozzle outlet openings 13a, 13b can be accurately calibrated and controlled to adjust the fluid flow through the nozzle outlet openings 13a, 13b to control the servovalve 1, as will be appreciated by the skilled person. The maximum amount of translation of the control element 16 is limited by the size of gap G between the nozzle outlet openings 13a, 13b and the thickness T of the central portion 16a of the control element 16, and is known as the stroke S of the servovalve 1, as shown in FIG. 1b, S=G−T. An exemplary stroke is 0.25 mm.

The servovalve assembly 10 as described above forms a pneumatic subassembly of the servovalve 1, and can be manufactured and packaged as a standalone module.

Solenoid assembly 20 is used to actuate pull rod 14 and apply the tensioning force to control element 16. In this manner, the solenoid assembly 20 forms a drive unit subassembly of the servovalve 1, and can also be manufactured and packaged as a standalone module.

As shown in FIG. 1a, solenoid assembly 20 is disposed within a servovalve housing 30 which attaches to the nozzle housing 11 using fastener 29. The servovalve housing 30 may be made of metal such as a non-magnetic stainless steel or a nickel alloy. Such a material provides improved high temperature strength offering mechanical protection to the other components of the solenoid assembly 20. The servovalve housing 30 may also be made of any other material that offers suitable thermal properties.

Solenoid assembly 20 comprises a soft magnetic adjustable core 28 having a first portion 28a and a second portion 28b. The first portion 28a of the adjustable core 28 is threaded and partially disposed through servovalve housing 30. A corresponding thread is provided in the servovalve housing 30. Thus, by rotating the first portion 28a of the adjustable core 28 about the longitudinal axis L, the adjustable core 28 can be moved along the longitudinal axis L in a direction either closer to the mounting plate 18 or away from it, depending on the direction of rotation.

The solenoid assembly 20 further comprises a soft magnetic plunger 24, having a first end 24a spaced from the second portion 28b of the adjustable core 28. The gap A between the second portion 28b and the first end 24a of the plunger 24 can be adjusted through rotation of the adjustable core 26 about longitudinal axis L. By adjusting the (air) gap between the first end 24a of the plunger 24 and the second portion 28b of the adjustable core 28 the resistance to magnetic flux within the solenoid assembly 20 can be altered. Thus, the current/displacement characteristics of the solenoid assembly 20 can be influenced by adjusting the gap A. This can assist in control of the tensioning force applied to the control element 16.

An end of the adjustable core 28 extending out of the servovalve housing 30 may be provided with a torque transferring feature 28c, for example for applying torque using a tool such as an allen key, a screw driver, a socket driver, etc. (not shown), to rotate the adjustable core 28 with respect to the screw thread and change the relative position of the adjustable core 28 with respect to the longitudinal axis L.

The soft magnetic plunger 24 may have a frusto-conical portion or tip 24a at one end which overlaps with a frusto-conical recess 28d of the adjustable core 28 for adjusting the flux strength. The other end of the plunger 24 is configured to attach to an end of the pull rod 14 extending through the nozzle housing 11. Thus, the plunger 24 may comprise a threaded recess 24b for threaded engagement with the end of the pull rod 14. Alternatively, the end of the pull rod 14 may be interference fitted within the recess 24b. The soft magnetic plunger 24 is arranged for reciprocating movement along the longitudinal axis L.

In this manner, pull rod 14 and plunger 24 can be connected to join the pneumatic and drive subassemblies of servovalve 1 together.

A solenoid 22 is also disposed within the servovalve housing 30 and is wound around a bobbin 21. The bobbin 21 and solenoid 22 are arranged to surround an extent of the plunger 24 and a portion of the core 28. The solenoid 22 is configured so that when it is energised, the solenoid 22 urges the plunger 24 away from the mounting plate 18 parallel to longitudinal axis L (i.e. pulled vertically up along longitudinal axis L when looking at FIG. 1a). In doing so, the aforementioned tensioning force is applied to the control element 16. The solenoid 22 may have ceramic insulation around the windings to improve thermal insulation of the coils disposed therein. The solenoid 22 may be energised by any desired command current so as to achieve the necessary tensioning force on control element 16 and thus flow requirements within the servovalve 1. Such command current can be balanced with the resistance to deformation of the end portions 16b, 16c (i.e. stiffness of control element 16) to give the desired metering in control element 16 movement (as previously discussed).

Bearings 23a, 23b are disposed around the plunger 24 between the bobbin 21 and the plunger 24 to facilitate and guide the movement of the plunger 24. Bearings 23a, 23b may comprise graphite, PTFE or any other suitable material that provides low friction and high temperature resistant properties.

A soft magnetic pole 26a is provided surrounding the second portion 28b of the adjustable core 28.

A soft magnetic pole 26b is provided to surround part of the plunger 24, and also secure it in a rest position, when the solenoid 22 not energised, by holding the plunger 26 in recess 27.

The poles 26a, 26b, the plunger 24 and the core 28 may all comprise soft magnetic materials. The solenoid assembly 20 may comprise no permanent magnets, thus giving it improved performance at higher temperatures where permanent magnets typically demonstrate a drop in their magnetic properties.

While the solenoid assembly 20 is shown as one which "pulls" the pull rod 14 under solenoid 22 energisation to deform the control element 16, it could be set up in an opposite configuration that instead "pushes" the pull rod 14 to return a deformed control element 16 to a non-deformed state when the solenoid is energised.

It is to be noted, that when assembling the servovalve 1 of the present disclosure, the modular pneumatic and drive subassemblies can be connected using pull rod 14 and plunger 24 (as discussed above), and then servovalve housing 30 secured to nozzle housing 11 using fastener 29.

As will be appreciated by the skilled person, in various embodiments, the servovalve assembly of the present disclosure can provide a simple and accurate servovalve mechanism that maintains effectiveness, even in high temperature environments. In addition, the modular nature of the subassemblies, in various embodiments, can reduce maintenance time and cost for the servovalve.

The invention claimed is:

1. A servovalve assembly comprising:
a pair of opposed nozzles spaced apart by a first gap (G); and
a control element (16) positioned in the first gap (G) between the pair of opposed nozzles;
wherein:
each nozzle has an outlet opening;
the control element has a central control portion and two resiliently deformable end portions at opposite ends of the central control portion;
the central control portion is perpendicular to a central axis (C) of each nozzle outlet opening; and
the control element is configured such that the two resiliently deformable end portions elastically deform when the control element is placed under tension by a force applied parallel to the central control portion, so as to move the central control portion in a direction parallel to the central axis (C) of each nozzle outlet opening;
wherein the central control portion has a higher stiffness than the resiliently deformable end portions.

2. The servovalve assembly of claim 1, wherein the central control portion is thicker than the resiliently deformable end portions.

3. The servovalve assembly of claim 1, wherein the central control portion is planar and the resiliently deformable end portions are curved.

4. The servovalve assembly of claim 1, wherein the control element further comprises two clamping regions, one at the end of each resilient deformable end portion, wherein the two clamping regions are offset from the central control portion along the central axis (C) of each nozzle outlet opening.

5. The servovalve assembly of claim 4, further comprising:
a nozzle housing;
a pull rod for connection to a solenoid assembly at least partially received at one end of the nozzle housing; and
a mounting plate at least partially received at an opposing end of the nozzle housing;
wherein:
a first of the two clamping regions is secured to the pull rod and a second of the two clamping regions is secured to the mounting plate.

6. The servovalve assembly of claim 5, wherein the mounting plate includes fluid ports configured to allow fluid communication through the mounting plate.

7. The servovalve assembly of claim 5, wherein the first clamping region is secured to the pull rod by a ball-joint.

8. The servovalve assembly of claim 5, further comprising:
a bellows seal having two opposed longitudinal ends, the bellows seal surrounding at least a portion of the pull rod;
wherein the bellows seal is secured to the nozzle housing at a first of the two opposed longitudinal ends and to the pull rod at a second of the two opposed longitudinal ends.

9. A servovalve comprising:
the servovalve assembly of claim 1, wherein the control element further comprises two clamping regions, one at the end of each resilient deformable end portion, wherein the two clamping regions are offset from the central control portion along the central axis (C) of each nozzle outlet opening, and further comprising:
a nozzle housing;
a pull rod for connection to a solenoid assembly at least partially received at one end of the nozzle housing; and
a mounting plate at least partially received at an opposing end of the nozzle housing; wherein: a first of the two clamping regions is secured to the pull rod and a second of the two clamping regions is secured to the mounting plate; and
a solenoid assembly, wherein the solenoid assembly comprises:
a soft magnetic core;
a soft magnetic plunger, the core and plunger being separated by a second gap (A); and
a solenoid surrounding at least a portion of the plunger and at least a portion of the core; and
wherein:
the pull rod is secured to the plunger and is moveable therewith; and
the solenoid is configured such that energising the solenoid urges the plunger and pull rod to move away from the mounting plate, applying tension to the control element.

10. The servovalve of claim 9, wherein the position of the soft magnetic core is adjustable, to vary the size of the second gap (A).

11. The servovalve of claim 9, further comprising:
a bobbin on which the solenoid is wound, wherein at least a portion of the plunger is surrounded by the bobbin; and
at least one bearing disposed between the bobbin and the plunger configured to facilitate movement of the plunger relative to the bobbin in response to energisation of the solenoid.

12. The servovalve of claim 11, wherein the at least one bearing comprises Polytetrafluoroethylene (PTFE) or graphite.

13. A method of assembling the servovalve, comprising:
providing the servovalve assembly in accordance with claim 9 that also includes a bellows seal having two opposed longitudinal ends, the bellows seal surrounding at least a portion of the pull rod; wherein the bellows seal is secured to the nozzle housing at a first of the two opposed longitudinal ends and to the pull rod at a second of the two opposed longitudinal ends;
providing a solenoid assembly that includes a solenoid assembly, wherein the solenoid assembly comprises:
a soft magnetic core;
a soft magnetic plunger, the core and plunger being separated by a second gap (A); and
a solenoid surrounding at least a portion of the plunger and at least a portion of the core; and wherein: the pull rod is secured to the plunger and is moveable therewith; and the solenoid is configured such that energising the solenoid urges the plunger and pull rod to move away from the mounting plate, applying tension to the control element; and
connecting the servovalve assembly to the solenoid assembly by securing the pull rod to the plunger.

14. The method of claim 13, further comprising:
providing a servovalve housing; and
securing the servovalve housing over the solenoid assembly.

15. The servovalve assembly of claim 3, wherein the resiliently deformable end portions are curved such that the control element is C-shaped.

16. The servovalve of claim 10, wherein the position of the soft magnetic core is adjustable by the soft magnetic core being threadably attached to a servovalve housing.

* * * * *